US012773832B2

(12) United States Patent
Lecler et al.

(10) Patent No.: US 12,773,832 B2
(45) Date of Patent: Oct. 27, 2026

(54) PROCESS FOR MANUFACTURING BY MOULDING AN OPTICAL COMPONENT, OPTICAL FIBRE COMPRISING SAID OPTICAL COMPONENT AND SYSTEM FOR MANUFACTURING BY MOULDING SAID OPTICAL COMPONENT

(71) Applicants: UNIVERSITE DE STRASBOURG, Strasbourg (FR); CENTRE NATIONAL DE LA RECHERCHE SCIENTIFIQUE, Paris (FR); INSTITUT NATIONAL DES SCIENCES APPLIQUEES, Strasbourg (FR); UNIVERSITE FERHAT ABBAS SETIF 1, Sétif (DZ)

(72) Inventors: Sylvain Lecler, Strasbourg (FR); Nacer Eddine Demagh, Sétif (DZ); Assia Guessoum, Sétif (DZ); Djamila Bouaziz, Chelghoum.Laid (DZ); Zaid Bouhafs, Commune Bousselam (DZ)

(73) Assignees: UNIVERSITE DE STRASBOURG, Strasbourg (FR); CENTRE NATIONAL DE LA RECHERCHE SCIENTIFIQUE, Paris (FR); INSTITUT NATIONAL DES SCIENCES APPLIQUEES, Strasbourg (FR); UNIVERSITE FERHAT ABBAS SETIF 1, Sétif (DZ)

( * ) Notice: Subject to any disclaimer, the term of this patent is extended or adjusted under 35 U.S.C. 154(b) by 330 days.

(21) Appl. No.: 18/273,642

(22) PCT Filed: Jan. 25, 2022

(86) PCT No.: PCT/EP2022/051611
§ 371 (c)(1),
(2) Date: Jul. 21, 2023

(87) PCT Pub. No.: WO2022/161943
PCT Pub. Date: Aug. 4, 2022

(65) Prior Publication Data
US 2024/0075699 A1 Mar. 7, 2024

(30) Foreign Application Priority Data
Jan. 26, 2021 (EP) .................................... 21315008

(51) Int. Cl.
*B29D 11/00* (2006.01)
*B29K 709/08* (2006.01)

(52) U.S. Cl.
CPC .... *B29D 11/00663* (2013.01); *B29K 2709/08* (2013.01)

(58) Field of Classification Search
CPC ...................... B29D 11/00663; B29K 2709/08
See application file for complete search history.

(56) References Cited

U.S. PATENT DOCUMENTS 7,474,821 B2 * 1/2009 Donlagic ............... G02B 6/262 385/35
2003/0136759 A1 7/2003 Mikolas
(Continued)

FOREIGN PATENT DOCUMENTS

EP 1351082 A1 10/2003
WO WO 96/02861 * 2/1996
WO 00/46622 A1 8/2000

OTHER PUBLICATIONS

Apr. 12, 2022 International Search Report issued in International Patent Application No. PCT/EP2022/051611.
(Continued)

*Primary Examiner* — Mathieu D Vargot
(74) *Attorney, Agent, or Firm* — Williams Mullen; R. Brian Drozd

(57) ABSTRACT

A process for manufacturing by moulding an optical component includes at least the following steps: a step of providing at least one mould, during which a glass profile is provided, said glass profile including a doping according to a predetermined geometry and having a refractive index profile depending on said doping and including at least an end including at least a structuring obtained by chemically etching of said doping, said structuring forming said at least one mould, and a moulding step, during which at least a moulding material suitable for forming at least an optical component is provided and arranged in said mould in order to shape said optical component.

22 Claims, 5 Drawing Sheets

(56) References Cited

U.S. PATENT DOCUMENTS

| | | | | |
|---|---|---|---|---|
| 2003/0179994 | A1* | 9/2003 | Caracci .................... | G02B 6/32<br>385/33 |
| 2008/0019639 | A1 | 1/2008 | Donlagic et al. | |
| 2013/0202263 | A1 | 8/2013 | Plain et al. | |

OTHER PUBLICATIONS

Aug. 4, 2022 Written Opinion issued in International Patent Application No. PCT/EP2022/051611.
Aug. 10, 2023 International Preliminary Report on Patentability issued in International Patent Application No. PCT/EP2022/051611.
Milton et al; "Mechanical fabrication of precision microlenses on optical fiber endfaces;" Optical Engineering, vol. 44 (12); 2005.
Zoran et al; "Technique for monolithic fabrication of microlens arrays" Applied Optics; vol. 27; No. 7; 1988.
Malki et al; "Two-step process for micro lens-fibre fabrication using a continuous CO2 laser source;" Journal of Optics A: Pure and Applied Optics; 2001.
Tien et al; "Design and fabrication of fiber lenses for optical recording applications" Japan Journal Applied Physics; vol. 41; 2002.
Thual et al; "Truncated gaussian beams through microlenses based on a graded-index section;" Optical Engineering; vol. 46(1); 2007.
Barnard et al; "Single-mode fiber microlens with controllable spot size;" Applied Optics; vol. 30; No. 15; 1991.
Eisenstein et al; "Chemically etched conical microlenses for coupling single-mode lasers into single-mode fibers;" Applied Optics; vol. 21; No. 19; 1982.
Kim et al; "Achievement of Large Spot Size and Long Collimation Length Using UV Curable Self-Assembled Polymer Lens on a Beam Expanding Core-Less Silica Fiber;" IEEE Photonics Technology Letters; vol. 16; No. 11; 2004.
Lachance et al; "Modes in Divergent Parabolic Graded-Index Optical Fibers;" Journal of Lightwave Technology; vol. 9; No. 11; 1991.
Nagel et al; "An overview of the modified chemical vapor deposition (MCVD) process and performance," IEEE Journal of Quantum Electronics; vol. 18; No. 4; pp. 459-476,; 1982.
Matejec et al; "Inverted-graded index fiber structures for evanescent-wave chemical sensing;" Sensors and Actuators; B 5; pp. 340-347; 1998.
Savovic et al; "Influence of initial dopant distribution in fiber core on refractive index distribution of thermally expanded core fibers;" Optical Materials 30; pp. 1427-1431; 2008.
Nacer-Eddine et al; "Chemical etching of concave cone fibre ends for core fibre alignment;" Measurement Science and Technology; vol. 17; 2005.
Thorlabs Graded-Index (GRIN) Multimode Fibers; [retrieved on Nov. 3, 2023]; Retrieved from the Internet: <URL: https://www.thorlabs.com/newgrouppage9.cfm?objectgroup_id=358).

* cited by examiner

PROCESS FOR MANUFACTURING BY MOULDING AN OPTICAL COMPONENT, OPTICAL FIBRE COMPRISING SAID OPTICAL COMPONENT AND SYSTEM FOR MANUFACTURING BY MOULDING SAID OPTICAL COMPONENT

The invention relates to the field of process for manufacturing by moulding an optical component, of optical fibre comprising an optical component and of system for manufacturing by moulding an optical component.

It is known that in the field of optics, precision on the geometry and surface quality of refractive, reflective and diffractive optical components, whether large or micrometric in size, are the main parameters to be optimised. Large optical components, such as telescope mirrors, for example, have particularly high requirements in terms of precision on their radius of curvature and surface defects which must necessarily be well below the wavelength. In addition to nano and micro components, for example, lenses with micrometric dimensions, so-called microlenses, require even greater precision, not only on the radius of curvature and their surface condition, but also on their handling, given their small dimensions, with the aim of centering and aligning them with other passive and/or active optical components. Indeed, microlenses can be combined with optoelectronic sensors, light sources, other optical components or devices, or optical fibres. The latter equipped with microlenses are sometimes referred to as intrinsic components when the microlenses are an integral part of the optical fibres and as extrinsic when the microlenses are separate components integrated at the end of the optical fibres. Microlenses associated with optical fibres, in particular single mode fibres (SMF) characterised by a small core diameter (a few microns) where the light is confined and guided, require, in this case, a centering and alignment accuracy of less than one half-micron with respect to the axis of the optical fibres. This requirement makes the handling of microlenses very delicate in view of the positioning instrumentation required.

Currently, various techniques for the manufacture of optical components and microcomponents have been proposed in several studies. These techniques are based on:

- mechanical machining [Gareth Milton, Yousef A. Gharbia, Jayantha Katupitiya, Mechanical fabrication of precision microlenses on optical fiber endfaces, Optical Engineering, 44(12), 123402 (2005).] or CMP (Chemical-mechanical polishing) [David Mikolas, Microlens array fabrication using CMP, patent US20030136759A1, 2002.],
- lithographic processes [Zoran et Al. Technique for monolithic fabrication of microlens arrays, Applied Optics, Vol. 27, No, 7 (1988)],
- powder fusion of optical materials,
- fusion/drawing of optical fibre ends [A. Malki et Al. Two-step process for micro lens-fibre fabrication using a continuous CO2 laser source, Journal of Optics A: Pure and Applied Optics (2001); Ch. Tien et Al. Design and fabrication of fiber lenses for optical recording applications, Jpn. J. Appl. Phys. Vol. 41 (2002).],
- welding of graded index microlenses (GRIN) [M. Thual et Al. Truncated gaussian beams through microlenses based on a graded-index section, Optical Engineering 46(1), (2007).],
- photo-polymerisation,
- the combination of chemical etching and melting, etc. [G. Eisenstein and D. Vitello, Chemically etched conical microlenses for coupling single-mode lasers into single-mode fibers, Applied Optics, Vol. 21, No. 19 (1982); Chris W. Barnard and John W. Y. Lit, Single-mode fiber microlens with controllable spot size, Applied Optics, Vol. 30, No. 15 (1991)].

Regarding the large components, the mechanical shaping and polishing of glass preforms is the most common technique used. However, this technique, although giving very good results, has disadvantages in relation to the long process duration, the irregularity of the radius of curvature, surface defects and roughness limited by the grain size of the polishing products.

Among the techniques used to manufacture microlenses, mechanical polishing or CMP (Chemical-mechanical polishing) are very delicate to use at these dimensions. The technique based on photolithography is one of the most widely used for making microlens matrices but not in optical fibre tips. It consists of melting micro-pillars previously etched by photolithography. It has the advantage of being efficient and makes it possible to obtain microcomponent of different dimensions and geometries (spherical, hemispherical) in a repetitive but expensive way and involves sophisticated manufacturing logistics (photolithography). Moreover, their handling and adjustment are complex as they are separate microlenses that must be placed in the right place. For these reasons, integrated microlenses are preferred in the manufacture of intrinsic micro-collimators in optical fibre tips. For this purpose, fusion techniques have been developed for the manufacture of microlenses at the end of optical fibres. For example, this involves focusing a high-power CO2 laser beam onto a length of optical fibre subjected to a tensile force until breakage. The hemispherical microlenses obtained at the end of the optical fibre can be of the order of 20 micrometer but with a low repeatability rate. Another technique is based on electric arc fusion of the optical fibre end. Due to the surface tension, this technique makes it possible to obtain hemispherical microlenses with a diameter close to that of the optical fibre used, with a relatively low repeatability rate.

Another technique has also been developed for welding Graded Gradient Index Microlenses (GRIN) to the fibres. This has provided a means of achieving compact micro-collimators, but the welding is subject to a mechanical alignment procedure and therefore induces a centering error.

Techniques based on photo-polymerisation have been reported by J. Kim, M. Han, S. Chang, I. Lee, and K. Oh, Achievement of Large Spot Size and Long Collimation Length Using UV Curable Self-Assembled Polymer Lens on a Beam Expanding Core-Less Silica Fiber, IEEE Photonics Technology Letters, Vol. 16, No. 11, (2004). They have provided solutions for the realisation of the welding process but only offer a low diversity of geometrical profiles.

In order to obtain tapered fibres, methods based on chemical etching, fusion or a combination of the two have made it possible to produce microlenses, which are only hemispherical and have small diameters.

All these methods, although providing solutions, are often complex and do not offer a choice of geometry, good repeatability, precise curvature radius and a guarantee of alignment and centering of the microlenses.

This invention has as its object to remedy at least to some of these drawbacks.

For this purpose, the present invention concerns a process for manufacturing by moulding an optical component according to claim 1.

The present invention also concerns an optical fibre comprising an optical component according to claim 17.

The present invention also concerns a system for manufacturing by moulding an optical component according to claim 18.

The invention will be better understood using the description below, which relates to several preferred embodiments, given by way of non-limiting examples and explained with reference to the accompanying drawings, in which FIG. 1 shows a front view of a system for manufacturing an optical component according to the invention and illustrates a process for manufacturing by moulding an optical component according to the invention during a step of providing at least one mould, FIG. 2 shows a top view of the system for manufacturing an optical component according to the invention and illustrates the process for manufacturing by moulding an optical component according to the invention during the step of providing at least one mould, FIG. 3 shows a side view of the system for manufacturing an optical component according to the invention and illustrates the process for manufacturing by moulding an optical component according to the invention during the step of providing at least one mould, FIG. 4 shows a top view of the system for manufacturing an optical component according to the invention and illustrates the process for manufacturing by moulding an optical component according to the invention during a moulding step, FIG. 5 shows a top view of the system for manufacturing an optical component according to the invention and illustrates the process for manufacturing by moulding an optical component according to the invention during a step of securing said optical component to a substrate, FIG. 6 shows a top view of the system for manufacturing an optical component according to the invention and illustrates the process for manufacturing by moulding an optical component according to the invention during a curing step, FIG. 7 shows a top view of the system for manufacturing an optical component according to the invention and illustrates the process for manufacturing by moulding an optical component according to the invention during a demoulding step, FIGS. 8 to 13 show different microlens with a parabolic profile attached to the end of a third optical fibre according to the invention.

According to this invention, the FIGS. 1 to 4 illustrate a process for manufacturing by moulding an optical component C, comprising at least the following steps:

- a step of providing at least one mould M, during which a glass profile 1 is provided, said glass profile 1 including a doping according to a predetermined geometry and having a refractive index profile depending on said doping and comprising at least an end 2 comprising at least a structuring 3 obtained by chemically etching of said doping, said structuring 3 forming said at least one mould M (FIGS. 1 to 3),
- a moulding step, during which at least a moulding material suitable for forming at least an optical component C is provided and arranged in said mould M in order to shape said optical component C (FIG. 4).

Advantageously, the present invention concerns the use of a glass profile 1 having an end 2 comprising at least a structuring 3 obtained by chemically etching as at least one mould M. The use of a structuring 3 obtained by chemically etching of said doping forming said at least one mould M allows to shape at least one mould M having a large choice of geometry, good repeatability, precise radius of curvature. The moulding material introduced into the mould M conforms to its shape and will be therefore the desired optical component C. The process according to the invention allows to obtain at least an optical component C with a large choice of geometry, good repeatability, precise radius of curvature.

Advantageously, in the present invention the doping has a predetermined geometry which means that previously a required doping is realized so as to fully control the shape of the mould M and thus the shape of the optical microcomponent C.

The glass profile 1 is preferably a waveguide.

Preferably, the structuring 3 is a microstructuring which allows to shape an optical microcomponent C.

When the structuring 3 is preferably concave, the invention allows to fill the cavity forming the at least one mould M with a moulding material.

Preferably, said mould M is concave and preferably has a conic or spherical or parabolic or hyperbolic or elliptic or toric geometry.

The chemical etching is proportional to the refractive index: the geometric profile of the mould M corresponds to the refractive index profile of said glass profile 1. The following bibliographical references describe the realization of the doping profiles, in particular showing how this doping profile can be controlled:

[1] E. W. Marchand, Gradient index optics, Academic Press, NY, (1978)

[2] Richard L. Lachance and Pierre-André Bélanger, Modes in Divergent Parabolic Graded-Index Optical Fibers, JOURNAL OF LIGHTWAVE TECHNOLOGY, Vol. 9, No. 11, 1425, November 1991

[3] Matejec V, Chomat M, Kasik I, Ctyroky J, Berkova D and Hayer M 1998 Inverted-graded index fiber structures for evanescent-wave chemical sensing, Sensors and Actuators, B 51 340-347

[4] THORLABS Graded-Index (GRIN) Multimode Fibers. (https://www.thorlabs.com/newgrouppage9.cfm?objectgroup_id=358)

[5] S. Nagel, J. MacChesney and K. Walker, "An overview of the modified chemical vapor deposition (MCVD) process and performance," in IEEE Journal of Quantum Electronics, vol. 18, no. 4, pp. 459-476, April 1982, doi: 10.1109/JQE.1982.1071596

[6] R. L. Lachance, Etude d'une fibre optique à profil d'indice parabolique divergent, Thèse, Université Laval, (1990)

[7] Capteur à fibre optique á gradient d'indice inversé basé sur la résonance plasmon de surface: applications a la detection d'espèces chimiques Thèse https://tel.archives-ouvertes.fr/tel-00001575/document

[8] Svetislav Savovic' and Alexandar Djordjevich, Influence of initial dopant distribution in fiber core on refractive index distribution of thermally expanded core fibers, Optical Materials 30, 1427-1431 (2008)

[9] Nacer-Eddine, Demagh & Assia, Guessoum & Aissat, Hind. (2005). Chemical etching of concave cone fibre ends for core fibre alignment. Measurement Science and Technology. 17. 119. 10.1088/0957-0233/17/1/019.

For instance, during the chemical etching, said glass profile 1 including the doping is immersed in a reactive solution, such as hydrofluoric acid or a base such as potassium hydroxide contained in a container. After etching, the glass profile 1 is moved and rinsed successively for instance with water and acetone.

Advantageously, when said glass profile 1 contacts the reactive solution, the chemical etching begins. Because of the loss of material by selective dissolution, the glass profile 1 is morphologically transforming over time with a speed depending on the concentration of the reactive solution and the temperature. The glass profile 1 is also morphologically transforming depending on the refractive index profile of said doping. The shapes of the structuring 3 obtained can be used as a mould M for the duplication of components. The mould M obtained by chemically etching may be concave or convex and preferably has a conic or spherical or parabolic or hyperbolic or elliptic or toric geometry.

Preferably, during said step of providing at least one mould M, said glass profile 1 is at least one first optical fibre F1 (FIGS. 1 to 3) or a preform.

The use of a first optical fibre F1 allows to obtain a microstructuring which allows to shape an optical micro-component C.

From the Modified Chemical Vapor Deposition (MCVD) technique used to dope classical optical fibre with a large variety of possible elements (germanium, fluor, phosphor, aluminum, bore, titanium, etc.) and doping profiles, to macroscopic assembly of glass rods and tubes, which are then fused, collapsed and then drawn for size reduction, as to fabricate microstructured fibres, a very large and not far from unlimited optical microcomponent C shapes can be fabricated.

Preferably, the at least one first optical fibre F1, may be movably mounted on a moving support as illustrated in the figures. The moving support preferably comprises a 3-axis micrometric stage 11 with three degrees of freedom and/or a horizontal rotation stage 12.

The moving support is provided for moving the at least one first optical fibre F1 in translation according to three degrees of freedom and/or in rotation according to at least one axis.

Preferably, at least one release agent is deposited on the at least one mould M. The release agent is for instance hexamethyl-dichloro-silane (HMDS) in vapour phase when the moulding material 4 is polydimethylsiloxane (PDMS).

The release agent is provided for facilitating the demoulding step describes below. The release agent is used for easily releasing the optical component C from said at least one mould M during a demoulding step described below.

Preferably, during said moulding step, said at least one moulding material is at least one curable moulding material 4 suitable for forming at least an optical component C in a cured state of said curable moulding material 4.

Advantageously, the at least on curable moulding material 4 allows in the liquid state to be easily introduced into the at least one mould M. Then in a cured state the curable moulding material 4 is sufficiently hard to form an optical component C having the shape of the mould M.

The curable moulding material 4 is for instance a crystallizable or polymerizable optical quality material (thermo-polymerizable, ultraviolet polymerizable or polymerizable by mixing a hardener).

Preferably, during said moulding step, said at least one curable moulding material 4 comprises at least one polymer.

The curable moulding material 4 is for instance polydimethylsiloxane (PDMS) or SU-8 photoresist.

Advantageously, these materials are transparent or translucent and their refractive index are close to the silica refractive index. These materials are also easy to polymerize by means of a heating source 9 and/or a source of ultraviolet rays 10.

Alternatively, the curable moulding material 4 is an optical adhesive such as a photosensitive resin for instance a Norland Optical Adhesives, NOA.

Preferably, during said moulding step, a mobile support 5 coated with said moulding material is used to drop or pour at least some, such as at least one droplet/drop 40, of said moulding material into said mould M (FIG. 4).

Advantageously, the mobile support 5 is movable and is provided for being moved in the direction of said at least one mould M.

The moulding material, such as a polymer, may be selected so as it does not spread evenly over said mobile support 5.

During said moulding step, a series of drops 40 of said moulding material may forms (FIG. 4).

Preferably, the mobile support 5 has a diameter range which is comprised between 100 micrometres and 600 micrometres.

The rigidity of the materials of the mobile support 5, i.e., the young module of the mobile support 5 is preferably comprised between 50 Gigapascals and 200 Gigapascals. For example, when the material of the module support 5 is silica, the young module is 68 Gigapascals. The mobile support 5 is for example a micro-wire or a fibre. However, at these sizes, the mechanical properties of the micro-wire, mainly depend on its geometry and size rather than the bulk material properties.

Preferably, surface treatments which may be chemical, electrochemical, or physical are used on the mobile support 5 to control the bubbles formation. For instance, the surface treatments can be passivation, oxygenation, use of HMDS (hexamethyl-dichloro-silane in vapor phase) for non-adhesion properties.

Preferably and as illustrated in FIG. 4, during said moulding step, said mobile support 5 consists of a second fibre F2, for example a second optical fibre.

Advantageously, the second fibre F2, for example the second optical fibre is sufficiently rigid, flexible, cheap and thin for precisely introducing the moulding material in the mould M having a micrometric size.

Preferably, the second fibre F2, for example the second optical fibre has a rigidity which is chosen so as the second fibre stays straight during its handling and so as the second fibre is bendable enough to allows its deformation if contacts occur.

Preferably, the diameter of the second fibre F2 for example the second optical fibre is chosen so as the second fibre holds only small droplets 40 of moulding material. A droplet 40 having a diameter of a few hundred micrometers may be considered a small droplet 40. Thus, the second fibre F2 is preferably the second optical fibre because it allows to hold small droplets 40.

Preferably, the second fibre F2, for example the second optical fibre, may be movably mounted on a moving support as illustrated in the FIG. 4. The moving support preferably comprises a 3-axis micrometric stage 52 with three degrees of freedom.

As shown in FIG. 4, the second fibre F2, for example the second optical fibre is preferably connected via a rigid extension 51 to the 3-axis micrometric stage 52. Preferably, during said moulding step the 3-axis micrometric stage 52 is moved so that one droplet/drop 40 of said moulding material touches the mould M. Because of the capillary forces, the moulding material becomes incrusted into said mould M. Then, the 3-axis micrometric stage 52 is moved so as to move away the second fibre F2, for example the second optical fibre from said mould M.

Preferably, said process comprises an adjustment step previous to said moulding step, during which the moving support of the first optical fibre F1 and/or the moving support of the second fibre F2, for example the second optical fibre is moved so as to place the first optical fibre F1 and the second fibre F2, for example the second optical fibre in the same plane.

Preferably, said adjustment step consists in focusing the image of the first optical fibre F1 and/or of the second fibre F2, for example the second optical fibre one by one in the same plane by means of a microscope with camera 16 or eyepiece.

The axial direction D1 of the second fibre F2, for example the second optical fibre is preferably perpendicular to the axial direction D of the first optical fibre F1 as illustrated in FIG. 4.

Advantageously, this configuration allows to avoid an air bubble formation in the mould M.

Preferably, the angle A between the axial direction D1 of the second fibre F2, for example the second optical fibre and the axial direction D of the first optical fibre F1 is advantageously comprised between 30 degrees and 60 degrees.

During said moulding step, preferably the second fibre F2, for example the second optical fibre is moved near by the mould M by being inclined at the angle A.

During said moulding step, preferably a drop/droplet 40 of moulding material comes into contact with a corner of the mould M and the moulding material fills the mould M only by capillarity.

Advantageously, this configuration allows the filling of the mould M to be made without any air bubble.

Preferably, the material and/or the diameter and/or the surface functionalization (hydrophilic, hydrophobia, etc.) of the second fibre F2, for example the second optical fibre may be modified to adapt the process to the different kind of viscosity, density, of the moulding material. This allows the droplet 40 size to be controlled.

Preferably, the second fibre F2, for example the second optical fibre is 20 millimeters to 30 millimeters long so as to maintain a certain rigidity of the second optical fibre.

An end 50 of the second fibre F2, for example the second optical fibre is preferably coated with said moulding material for instance with a tip during said moulding step.

In a preferred first embodiment not illustrated, said process comprises a curing step subsequent to said moulding step, during which said at least one curable moulding material 4, preferably at least one polymer, is cured to form an optical component C, said curable moulding material 4 is cured by means of a heating source 9 and/or a drying device and/or a source of ultraviolet rays 10.

Advantageously, the curing step allows the curable moulding material 4 to be hardened so as to form an optical component C having the shape of the mould M.

The heating source 9 may be a heating resistor.

The polymerisation of the polymer is done according to the nature of the polymer and the conditions of its curing. Whether the polymer is bi-component, thermo-polymerisable or UV polymerisable, the heating source 9, source of ultraviolet rays 10, is respectively activated.

Preferably, said process comprises a demoulding step subsequent to said curing step, during which said optical component C is released from said mould M.

Thus, at the end of the demoulding step, at least one individual optical component C is obtained. If one mould M is provided, thus one individual optical component C may be obtained. If a plurality of mould M is provided, thus a plurality of individual optical component C may be obtained.

In a preferred second embodiment and as illustrated in FIGS. 5 and 6, said process comprises a step of securing said optical component C to a substrate 6, during which said at least one curable moulding material 4 arranged in said mould M is joined to a substrate 6.

Preferably, the substrate 6 may be a waveguide, a photodector, a diode.

Preferably and as illustrated in FIG. 6, said process comprises a curing step subsequent to said step of securing said optical component C to a substrate 6, during which said at least one curable moulding material 4, preferably at least one polymer, is cured to form an optical component C joined to said substrate 6, said curable moulding material 4 is cured by means of a heating source 9 and/or a drying device and/or a source of ultraviolet rays 10.

Advantageously, the curing step allows the curable moulding material 4 to be hardened so as to form an optical component C having the shape of the mould M attached to said substrate 6.

The heating source 9 may be a heating resistor.

The polymerisation of the polymer is done according to the nature of the polymer and the conditions of its curing. Whether the polymer is bi-component, thermo-polymerisable or UV polymerisable, the heating source 9, source of ultraviolet rays 10, is respectively activated.

Preferably and as illustrated in FIG. 7, said process comprises a demoulding step subsequent to said curing step, during which said optical component C joined to said substrate 6 is released from said mould M.

Thus, at the end of the demoulding step, at least one optical component C joined to said substrate 6 is obtained. If one mould M is provided, thus one optical component C joined to said substrate 6 may be obtained. If a plurality of mould M is provided, thus a plurality of optical component C joined to said substrate 6 may be obtained.

Preferably and as illustrated in FIGS. 5 and 6, the substrate 6 used during said step of securing said optical component C to a substrate 6, is at least one third optical fibre F3 comprising a junction end 7 to which said at least one curable moulding material 4 arranged in said mould M is connected to.

Advantageously, at the end of said process, this will result in the formation of an at least one optical component C attached to the junction end 7 of said third optical fibre F3. If one mould M is provided, thus one optical component C joined to said third optical fibre F3 may be obtained. The third optical fibre F3, may be movably mounted on a moving support as illustrated in the figures. The moving support preferably comprises a 3-axis micrometric stage 11 with three degrees of freedom and/or a horizontal rotation stage 12.

Preferably, said process comprises an alignment step previous to said moulding step, during which said mould M of the first optical fibre F1 and said junction end 7 of the third optical fibre F3 are preferably brought close together.

Advantageously, this alignment step allows to obtain one optical component C joined to said junction end 7 of the third optical fibre F3.

During said alignment step, the moving support of the first optical fibre F1 and/or the moving support of the third optical fibre F3 is preferably moved so as to align the first optical fibre F1 and the third optical fibre F3 according to their respective axial direction D. Preferably, the alignment step is subsequent to said adjustment step.

Advantageously, this alignment step allows to obtain one optical component C joined to and aligned with said junction end 7 of the third optical fibre F3. Preferably, the optical component C is aligned with the core of the third optical fibre F3.

In this case alternatively, during said moulding step described above, the third optical fibre F3 coated with said moulding material may be used to drop or pour at least some, such as at least one droplet, of said moulding material into said mould M.

During said alignment step, a light source 13 such as for example a laser or a laser diode or a diode, is preferably used for injecting light into the third optical fibre F3 and a photodetector 14, such as for example a photodiode or equivalent, is used for capturing the light at the output of the first optical fibre F1, after passing through said junction end 7 of the third optical fibre F3 and said mould M of the first optical fibre F1.

Advantageously, this configuration allows to improve the alignment of the first optical fibre F1 and the third optical fibre F3 according to their respective axial direction D.

Alternatively, during said alignment step, a light source such as for example a laser or a laser diode or a diode, is preferably used for injecting light into the first optical fibre F1 and a photodetector, such as for example a photodiode or equivalent, is used for capturing the light at the output of the third optical fibre F3, after passing through said junction end 7 of the third optical fibre F3 and said mould M of the first optical fibre F1.

During said alignment step, the moving support of the first optical fibre F1 and/or the moving support of the third optical fibre F3 is preferably moved so as to maximize the signal of said photodetector 14.

Advantageously, this configuration allows to improve the alignment of the first optical fibre F1 and the third optical fibre F3 according to their respective axial direction D.

During said alignment step, the image of said junction end 7 of the third optical fibre F3 and the image of said mould M of the first optical fibre F1 are preferably focused by means of the microscope 15 with camera 16 or eyepiece.

During said alignment step, a light source including a light diffuser 17 preferably illuminates said junction end 7 of the third optical fibre F3 and said mould M of the first optical fibre F1.

The light diffuser is preferably a translucent paper, organic or frosted mineral glass. The closer it is to the first and third optical fibres F1, F3, the sharper the outlines of the images seen under the microscope 15. Therefore, the alignment of the first and third optical fibres F1, F3 will be more precise.

Preferably, during said step of securing said optical component C to a substrate 6, said junction end 7 comprises a planar 8 (FIG. 5) or concave interface to which said at least one curable moulding material 4 arranged in said mould M is connected to.

Preferably and as illustrated in FIGS. 5 and 6, during at least said step of securing said optical component C to a substrate 6, the first optical fibre F1 and the third optical fibre F3 are aligned according to their respective axial direction D, preferably at least by optical transmission.

Advantageously, this alignment allows to obtain one optical component C joined to and aligned with said junction end of the third optical fibre F3. Preferably, the optical component C is aligned with the core of the third optical fibre F3.

Preferably and as illustrated in FIGS. 5 and 6, during said step of securing said optical component C to a substrate 6, said mould M of the first optical fibre F1 and said junction end 7 of the third optical fibre F3 are placed in contact with each other.

Thus, because of the capillary forces the curable moulding material 4 may spread over the planar 8 (FIG. 5) or concave interface of said junction end 7.

Preferably and as illustrated in FIG. 7, during said demoulding step said mould M of the first optical fibre F1 and said junction end 7 of the third optical fibre F3 are moved away from each other.

During said demoulding step, the moving support of the first optical fibre F1 and/or the moving support of the third optical fibre F3 is preferably moved so as to move away said mould M of the first optical fibre F1 from said junction end 7 of the third optical fibre F3.

Preferably, said optical component C is a microlens, preferably a convex or planoconvex or biconvex or meniscus lens or Fresnel lens.

The above-mentioned optical component C may be made reflective by coating of metallic materials or dielectric multilayers. Thus, the optical component C may be a mirror.

For instance, at the end of said process and when the mould M is concave, a microlens with a parabolic profile attached to the end of the third optical fibre F3 may be obtained forming an optical component C called a micro-collimator. Such parabolic lenses, often referred to as aspherical lenses, are known to be free of spherical aberrations and allow focusing up to the diffraction limit. This type of optical component C are normally difficult to manufacture.

Figure 1:
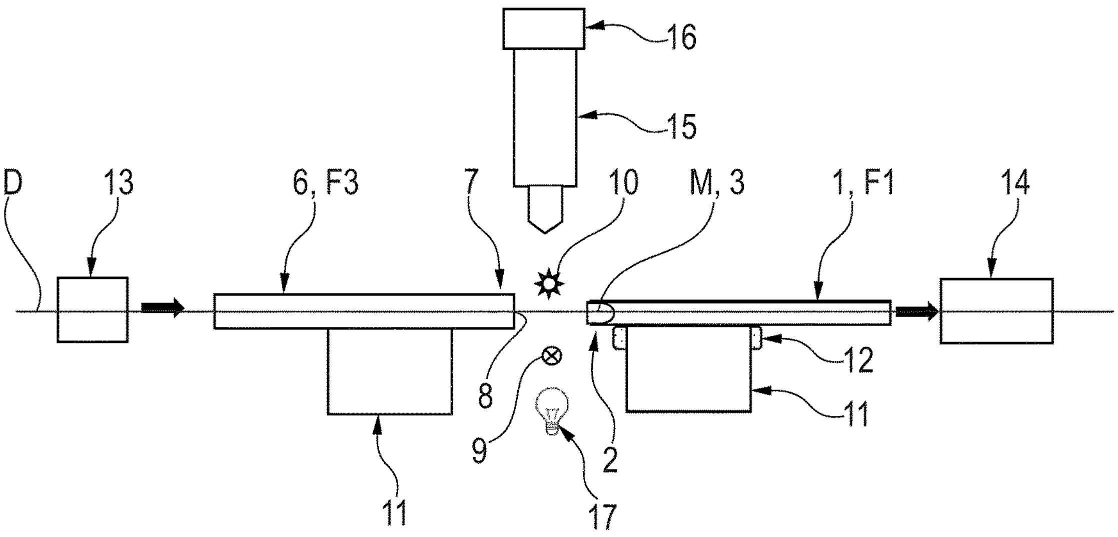
Figure 2:
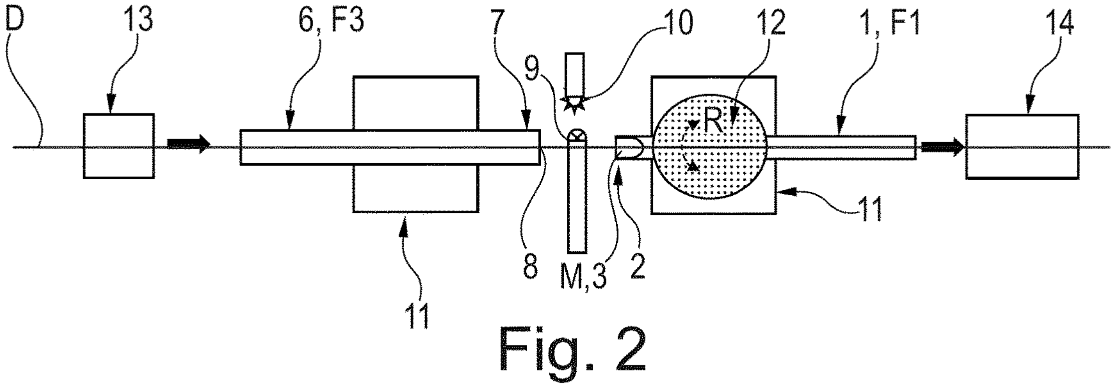

The first and third optical fibre F1, F3 may be a single-mode or multimode optical fibre, a single core or multi-core fibre.

For multicore fibres, the core-to-core distance measures preferably few tens of micrometers.

For instance, the first optical fibre F1 and the third optical fibre F3 are the same multicore fibres. Thus, the first optical multicore fibre F1 may comprise a plurality of mould M and the third optical multicore fibre F3 may comprise a plurality of optical components C.

Advantageously, in this case, all the moulds M are aligned and fabricated together, and all the optical components C are aligned and fabricated together.

Preferably, the microlens C and the core of the third optical fibre F3 are aligned.

Alternatively, the microlens C and the core of the third optical fibre F3 are mis-aligned.

Advantageously, microlens C having a base diameter larger than the core of the third optical fibre F3, can be voluntarily shift from the core center of the third optical fiber F3 for asymmetric applications as lateral focusing, collimation or light collection. When the microlens C position is shifted, the core of the third optical fibre F3 must be still covered by the microlens C. Preferably, the microlens base will be at least two times larger than the core diameter. The microlens C cover the third optical fibre F3 core but is voluntary mis-aligned from its center. This misalignment is controlled. In typical case, the light from third optical fibre F3 will have a total internal reflection on the first half-microlens C part and will be focused by the second half microlens C part. It is the inverse for light collection.

Preferably, the third optical fibre F3 is a non-silica fibre as for example mid-infrared fibre such as Fluoride, Halogenide, Chalcogenide, Telluride or similar or ultraviolet fibre.

Advantageously, the process according to the invention can be used to fabricate microlens C on non-silica fibres as for example mid-infrared fibres such as Fluoride, Halogenide, Chalcogenide, Telluride, or similar or ultraviolet fibres.

In this case, the moulding material is a polymer which must be transparent in the application spectra of the third optical fibre F3 requiring the microlens C. It must also be transparent in a part of the transmission spectra of the first optical fibre F1 holding the mould M. It is required for the optical alignment.

Many fibres, such as the ones used in the mid-infrared domain, are very sensitive to temperature variations. Temperature increase may cause dilatation disturbing the optical alignment, and/or develop harmful gases. Selecting a polymer that can be cured without temperature increase is important.

Many polymers required thermic processes. Thermoset polymers need to be heated to be cured. SU8 resin needs to be heated to be easily handled. They are not adapted for such a specific fibre.

Polymers that can be cured by solvent evaporation, bicomponent glue reaction, or ultraviolet insolation are better choices.

Polydimethylsiloxane (PDMS) and NOA61 are good solution for mid-infrared fibres due to their transmission spectrum and curing process.

PDMS is also biocompatible, has a good adhesion to glass and silica.

For these reasons, preferably when the third optical fibre F3 is a non-silica fibre as for example mid-infrared fibres as Fluoride, Halogenide, Chalcogenide, Telluride, etc. or ultraviolet fibre, the moulding material is a polymer that can be cured by solvent evaporation or a bicomponent glue reaction or ultraviolet insolation, for example PDMS or NOA61.

According to another embodiment of the invention, the process comprises before the step of providing at least one mould M:

- a doping step, during which a doping having a first diameter according to a predetermined geometry is included in the first optical fibre F1,
- a melting-drawing technique step, during which the first diameter of the doping of the first optical fibre F1 is reduced to a second diameter up to twenty times,
- an etching step, during which at least the end 2 of the first optical fibre F1 is etched so as to obtain a structuring 3 obtained by chemically etching of said doping, said structuring 3 forming said at least one mould M.

Advantageously, in this embodiment of the invention, a microlens C with a diameter and/or curvature radius smaller than 50 lam can be created.

For example, the first optical fiber F1 has a parabolic doping concentration in a core having a first diameter of 50 micrometer. This first diameter can be reduced for instance ten times by the melting-drawing technique step. Thus, the first optical fiber F1 has a parabolic doping concentration in a core having a second diameter of 5 micrometer. After, the etching step, a mould M is obtained making possible the fabrication of a microlens C having a 5 micrometers diameter and a parabolic shape.

Figure 13:
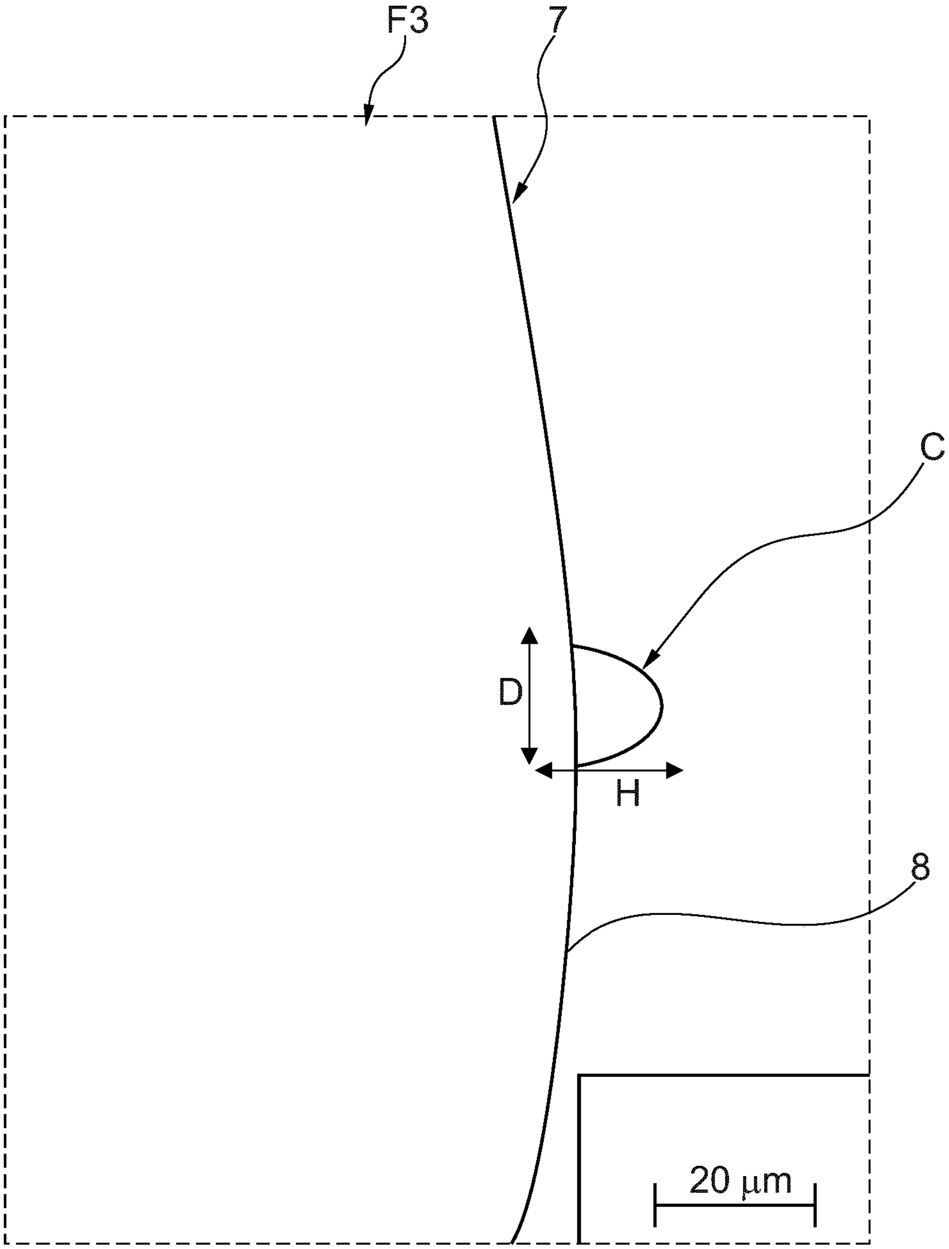

FIG. 13 illustrates an example of microlens C with a 5 μm radius of curvature fabricated with this embodiment.

The melting-drawing technique is inspired from the optical fiber fabrication method, where a preform, with a diameter of few centimeters, is melted and drawn to achieve a 125 μm diameter fiber. However, in the present process the temperature control allows the doping migration to be avoided during the process. The doping migration can also be anticipated in the first large scale doping.

The present invention also concerns an optical fibre F3 comprising an optical component C and as illustrated in FIGS. 7 to 12, said optical fibre F3 comprising a junction end 7 to which said optical component C is joined or connected to, characterised in that said optical component C is made from a moulding material suitable for forming at least an optical component C and in that said optical component C comprises a junction interface 4' directly in contact with said junction end 7.

Preferably, said optical component C is a microlens with a diameter and/or curvature radius smaller than 50 micrometers, having preferably a parabolic shape.

Preferably, the third optical fibre F3 is on a non-silica fibre as for example mid-infrared fibre such as Fluoride, Halogenide, Chalcogenide, Telluride or similar or an ultraviolet fibre. This optical fibre F3 according to the invention is preferably obtained by the process according to the invention described above.

The present invention also concerns a system for manufacturing by moulding an optical component C as illustrated in the figures and comprising:

- at least a first optical fibre F1 comprising an end 2 with at least a structuring 3 obtained by chemically etching, said structuring 3 forming a mould M,
- a mobile support 5 suitable to be coated with a moulding material arranged so as to drop or pour at least some, such as at least one droplet/drop 40, of said moulding material into said mould M.

This system according to the invention is preferably used to implement the process according to the invention described above.

Figure 4:
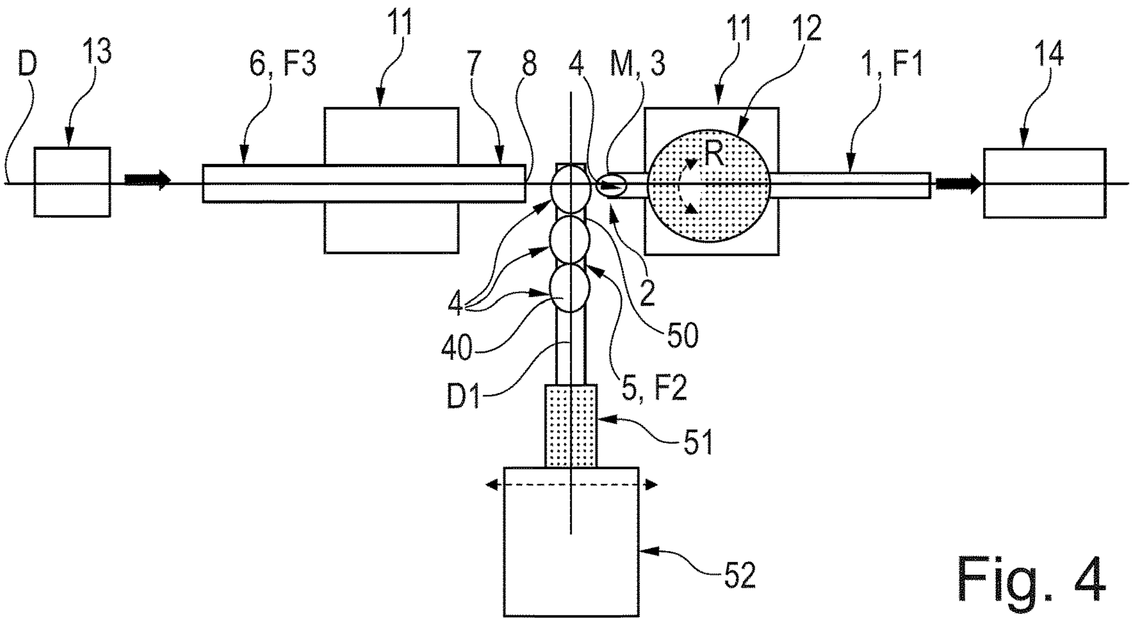
Figure 5:
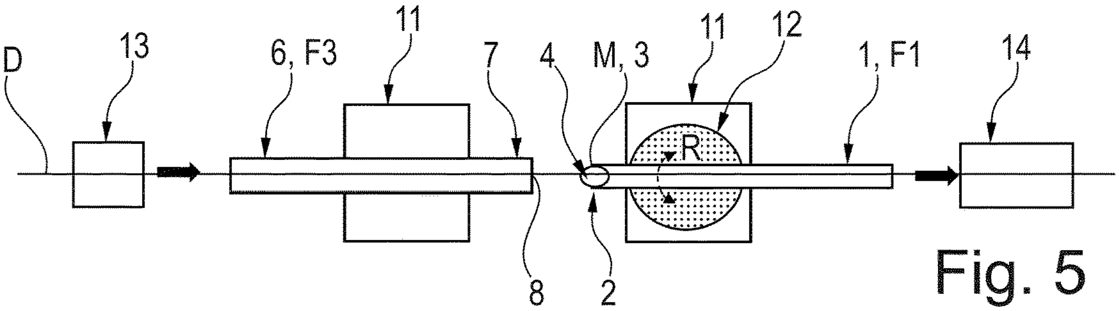
Figure 6:
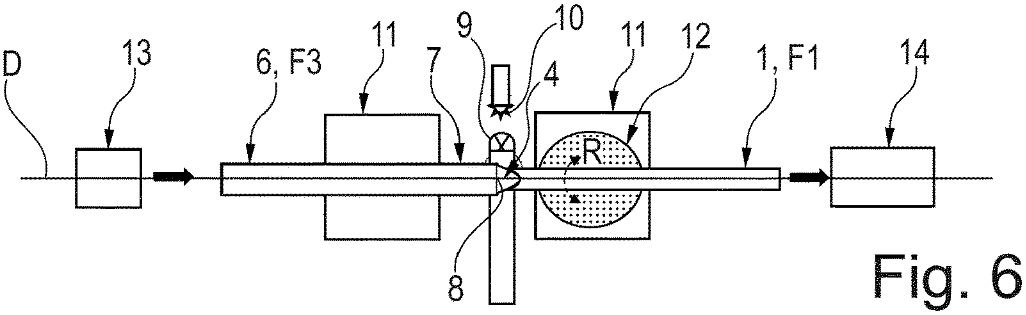
Figure 7:
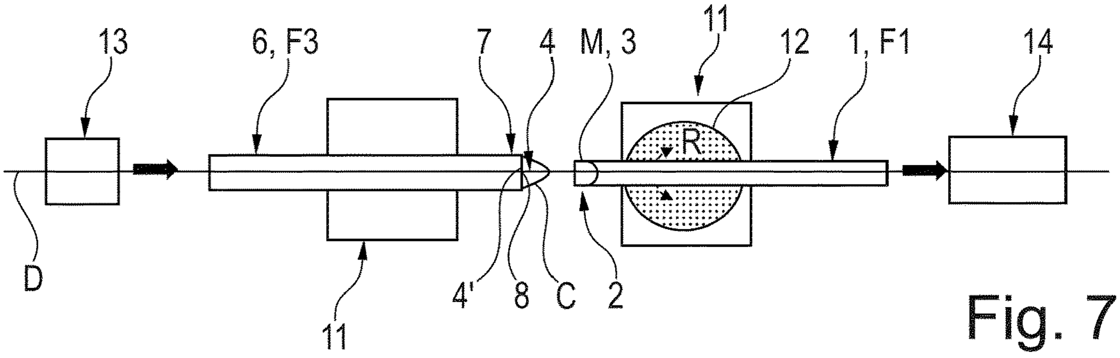
Figure 8:
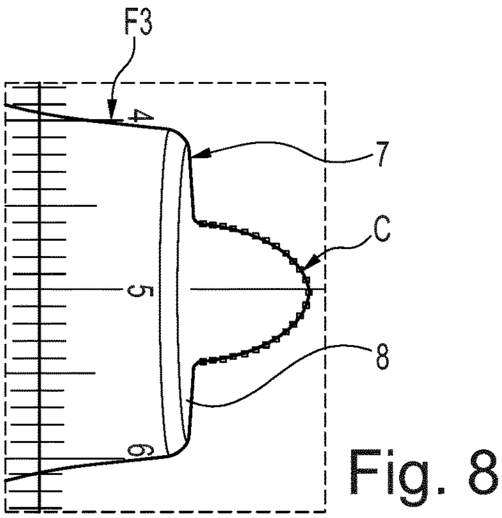
FIG. 8 shows a parabolic microlens C in PDMS on a 9/125 third optical fibre F3 (height of 50 micrometers, base of 54 micrometers and curvature radius of the end R=17.5 micrometers). This allows the coupling at hundred percent (excluding loss of reflection) of the 9/125 third optical fibre F3 with the microlens C to another 4/125 optical fibre ($\lambda$=1.31 μm)
Figure 9:
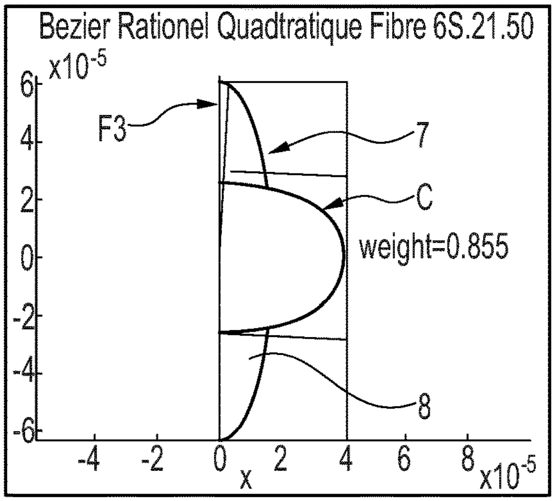
FIG. 9 shows a microlens C in SU8 on 9/125 optical fibre F3 (height of 40 micrometers, base of 51 micrometers) for collimation at $\lambda$=1064 nm.
Figure 10:
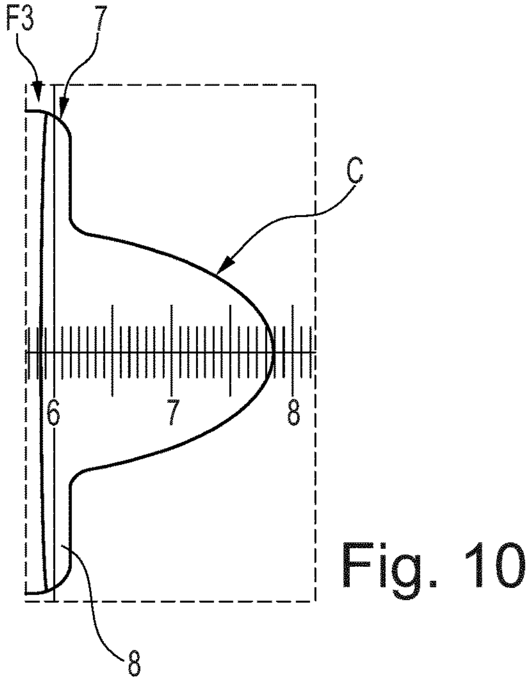
FIG. 10 shows SU8 microlens C on a 50/125 third optical fibre F3 (height 56 micrometers, base 56 micrometers) for fundamental mode focusing at $\lambda$=633 nm.
Figure 11:
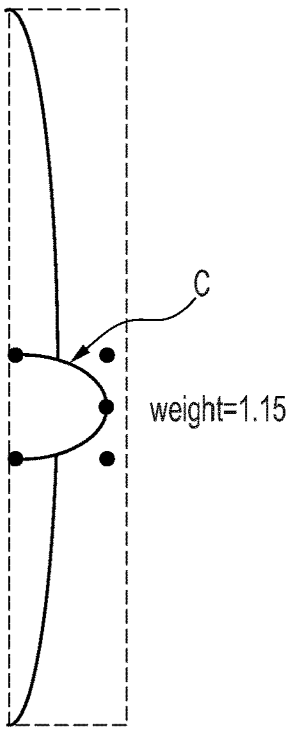
FIG. 11 shows SU8 microlens C on 9/125 third optical fibre F3 (height 12.5 micrometers, base 14 micrometers) for focusing at $\lambda$=1550 nm. Working distance: 7.4 micrometers.
Figure 12:
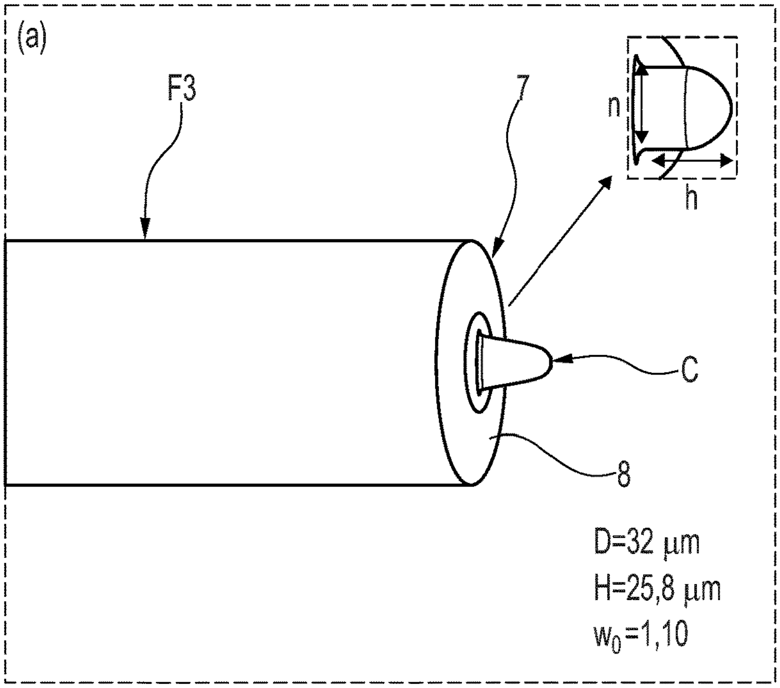
FIG. 12 shows SU8 microlens C on 20/125 third optical fibre F3 (height 26 micrometers, base 32 micrometers) for focusing at $\lambda$=1550 nm. Working distance: 21 micrometers.

Preferably and as illustrated in FIG. 4, said mobile support 5 consists of a second fibre F2, for example a second optical fibre.

Advantageously, the second fibre F2, for example the second optical fibre, is sufficiently rigid, flexible, cheap and thin for precisely introduced the moulding material in the mould M having a micrometric size.

Preferably, the second fibre F2, for example the second optical fibre, may be movably mounted on a moving support as illustrated in the FIG. 4. The moving support preferably comprises a 3-axis micrometric stage 52 with three degrees of freedom.

As shown in FIG. 4, the second fibre F2, for example the second optical fibre is preferably connected via a rigid extension 51 to a 3-axis micrometric stage 52. Preferably, during said moulding step the 3-axis micrometric stage 52 is moved so that one droplet of said moulding material touches the mould M. Because of the capillary forces, the moulding material becomes incrusted into said mould M. Then, the 3-axis micrometric stage 52 is moved so as to move away the second optical fibre from said mould M.

Preferably and as illustrated in the figures, the system for manufacturing by moulding an optical component C comprises a third optical fibre F3, the first optical fibre F1 and the third optical fibre F3 being aligned according to their respective axial direction D.

Preferably and as illustrated in FIGS. 1 to 3 and 6, the system for manufacturing by moulding an optical component C comprises a heating source 9 and/or a drying device and/or a source of ultraviolet rays 10 configured to cure said moulding material which is a curable moulding material 4.

The heating source 9 may be a heating resistor.

The at least one mould M, preferably a first optical fibre F1, and/or the third optical fibre F3, may be movably mounted on a moving support as illustrated in the figures. The moving support preferably comprises a 3-axis micrometric stage 11 with three degrees of freedom and/or a horizontal rotation stage 12.

Preferably, the system for manufacturing by moulding an optical component C as illustrated in the FIGS. 1 to 2 and 4 to 7 also comprises a light source 13 such as for example a laser or a laser diode, or a diode preferably of low power which is intended and able to be injected into the third optical fibre F3.

Preferably, the system for manufacturing by moulding an optical component C as illustrated in the FIGS. 1 to 2 and 4 to 7 also comprises a photodetector 14, such as for example a photodiode or equivalent, able and intended to capture the light at the output of the first optical fibre F1, after passing through said junction end 7 of the third optical fibre F3 and said mould M of the first optical fibre F1.

Figure 3:
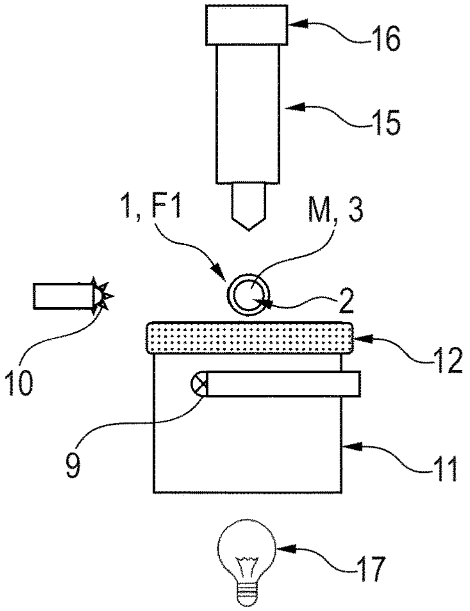

Preferably, the system for manufacturing by moulding an optical component C as illustrated in the FIGS. 1 and 3 also comprises a microscope with camera 16 or eyepiece which allows for easy adjustment. The microscope is preferably attached to a stage with three degrees of freedom Preferably, the minimum microscope specifications is as follow: eyepiece ×12.5 and objective ×3.2 and ×10.

Preferably, the system for manufacturing by moulding an optical component C as illustrated in the FIGS. 1 and 3 also comprises a light source including a light diffuser 17 illuminating said junction end 7 of the third optical fibre F3 and said mould M of the first optical fibre F1.

The light diffuser is preferably a translucent paper, organic or frosted mineral glass. The closer it is to the first and third optical fibres F1, F3, the sharper the outlines of the images seen under the microscope 15. Therefore, the alignment of the first and third optical fibres F1, F3 will be more precise.

Of course, the invention is not limited to the at least one embodiment described and represented in the accompanying drawings. Modifications remain possible, particularly from the viewpoint of the composition of the various elements or by substitution of technical equivalents without thereby exceeding the field of protection of the invention.

The invention claimed is:

1. A process for manufacturing by moulding an optical component, comprising at least the following steps:

a step of providing at least one mould, during which a glass profile is provided, said glass profile including a doping according to a predetermined geometry and having a refractive index profile depending on said doping and comprising at least an end comprising at least a structuring obtained by chemically etching of said doping, said structuring forming said at least one mould, a moulding step, during which at least curable polymer as a moulding material is provided and arranged in said mould in order to shape said optical component, and a curing step, subsequent to the moulding step, during which the curable polymer is cured to form the optical component.

2. The process for manufacturing by moulding an optical component according to claim 1, wherein during said step of providing at least one mould, said glass profile is at least one first optical fibre or a preform.

3. The process for manufacturing by moulding an optical component according to claim 1, wherein during said moulding step, a mobile support consisting of a second optical fibre coated with said curable polymer is used to drop or pour at least some of said curable polymer into said mould.

4. The process for manufacturing by moulding an optical component according to claim 3, wherein during said moulding step, said mobile support has a diameter range which is comprised between 100 micrometres and 600 micrometres.

5. The process for manufacturing by moulding an optical component according to claim 1, wherein during said curing step, said curable polymer is cured by means of a heating source and/or a drying device and/or a source of ultraviolet rays.

6. The process for manufacturing by moulding an optical component according to claim 5, wherein said process comprises a demoulding step subsequent to said curing step, during which said optical component is released from said mould.

7. The process for manufacturing by moulding an optical component according to claim 3, wherein said process comprises a step of securing said optical component to a substrate, during which said curable polymer arranged in said mould is joined to a substrate.

8. The process for manufacturing by moulding an optical component according to claim 7, wherein said process comprises a curing step subsequent to said step of securing said optical component to a substrate, during which said curable polymer is cured to form an optical component joined to said substrate, said curable polymer is cured by means of a heating source and/or a drying device and/or a source of ultraviolet rays.

9. The process for manufacturing by moulding an optical component according to claim 8, wherein said process comprises a demoulding step subsequent to said curing step, during which said optical component joined to said substrate is released from said mould.

10. The process for manufacturing by moulding an optical component according to claim 7, wherein the substrate used during said step of securing said optical component to a substrate, is at least one third optical fibre comprising a junction end to which said curable polymer arranged in said mould is connected to.

11. The process for manufacturing by moulding an optical component according to claim 10, wherein during said step of securing said optical component to a substrate, said junction end comprises a planar or concave interface to which said curable polymer arranged in said mould is connected to.

12. The process for manufacturing by moulding an optical component according to claim 10, wherein during at least said step of securing said optical component to a substrate, the first optical fibre and the third optical fibre are aligned according to their respective axial direction.

13. The process for manufacturing by moulding an optical component according to claim 12, wherein during said step of securing said optical component to a substrate, said mould of the first optical fibre and said junction end of the third optical fibre are placed in contact with each other.

14. The process for manufacturing by moulding an optical component according to claim 9, wherein during said demoulding step said mould of the first optical fibre and said junction end of the third optical fibre are moved away from each other.

15. The process for manufacturing by moulding an optical component according to claim 1, wherein said optical component is a microlens.

16. The process for manufacturing by moulding an optical component according to claim 1, wherein said mould is concave.

17. The process for manufacturing by moulding an optical component according to claim 2, comprising before the step of providing at least one mould:

a doping step, during which a doping having a first diameter according to a predetermined geometry is included in the first optical fibre, a melting-drawing technique step, during which the first diameter of the doping of the first optical fibre is reduced to a second diameter up to twenty times, an etching step, during which at least the end of the first optical fibre is etched so as to obtain a structuring obtained by chemically etching of said doping, said structuring forming said at least one mould.

18. A system for manufacturing by moulding an optical component comprising:

at least a first optical fibre comprising an end with at least a structuring obtained by chemically etching, said structuring forming a mould, a mobile support suitable to be coated with a curable polymer as a moulding material, said mobile support being arranged so as to drop or pour at least some, of said curable polymer into said mould, and a source of energy configured to cure said curable polymer within the mould to form the optical component.

19. The system for manufacturing by moulding an optical component according to claim 18, wherein the mobile support consists of a second optical fibre, and wherein the system further comprises a third optical fibre adapted to serve as a substrate to which the optical component is joined, the first optical fibre and the third optical fibre being alignable according to their respective axial direction.

20. The system for manufacturing by moulding an optical component according to claim 18, wherein the source of energy is selected from the group consisting of a heating source, a drying device, and a source of ultraviolet rays.

21. The system according to claim 18, wherein the at least some of said curable polymer comprises at least one droplet or drop.

22. The process for manufacturing by moulding an optical component according to claim 3, wherein the at least some of said curable polymer comprises at least one droplet or drop.

* * * * *